Patented July 27, 1937

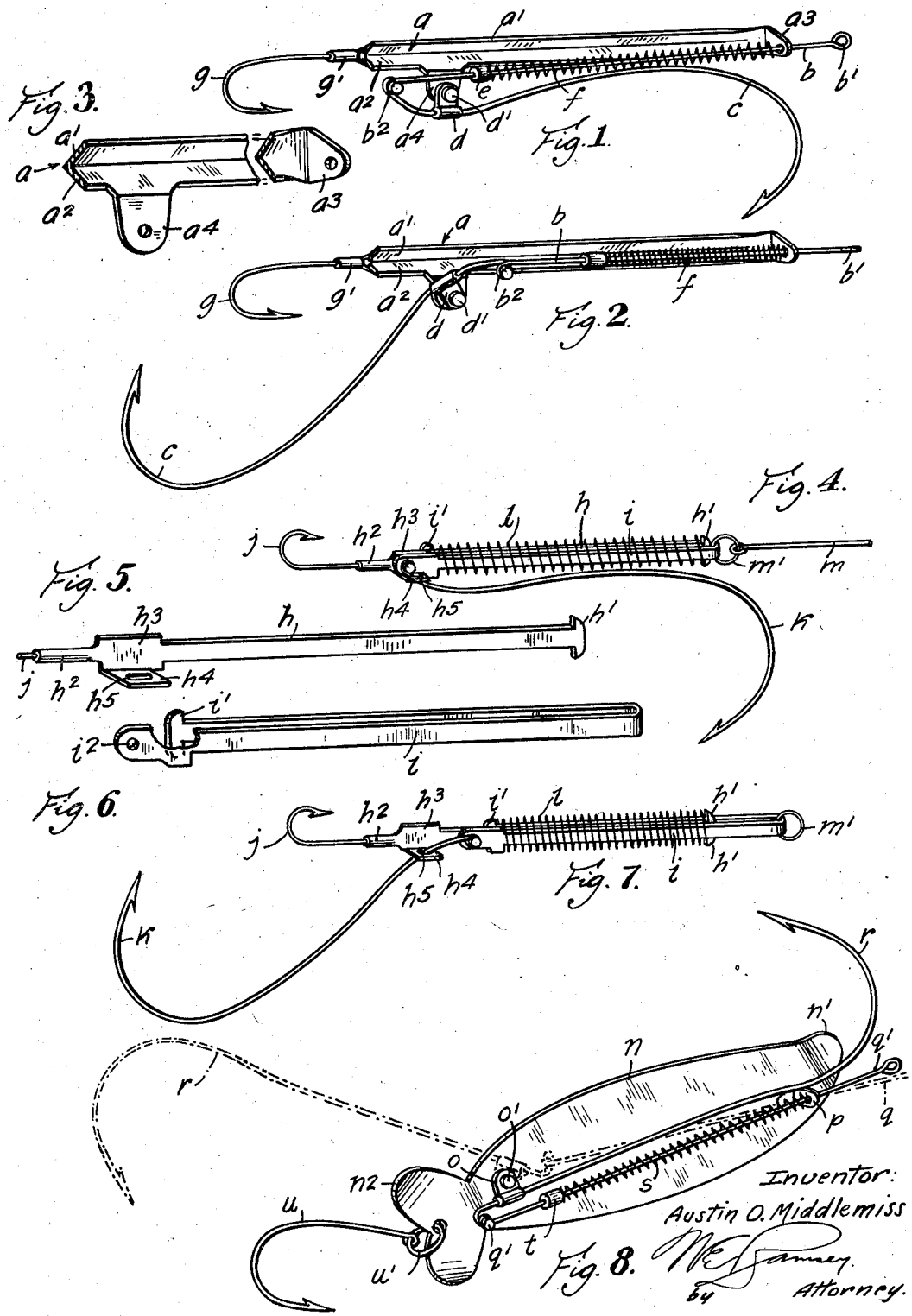

2,087,955

UNITED STATES PATENT OFFICE 2,087,955

FISHHOOK

Austin O. Middlemiss, Portland, Oreg.

Application July 15, 1936, Serial No. 90,715

6 Claims. (Cl. 43—37)

The object of this invention is to provide a fishing device with a bait or fish catching hook and another, a gaffing hook, pivotally secured thereto. Said gaffing hook is adapted normally to be spaced from the first mentioned hook and to be brought into proximity thereto by the pull of a fish on the line connection. Said device is adapted to carry a lure, float or other auxiliary device which will not interfere with the action of said fishing device.

This object is attained in a device of this character provided with a body, a bait hook secured at one end with a gaff hook pivotally secured to said body at a point spaced from said first mentioned hook. Line connections include a reciprocally mounted member operatively secured to the fishing line. A coil spring surrounds said line connection and is adapted to hold the gaff hook in inoperative position in parallelism with said body and at a point away from the so-called bait hook. Said spring has sufficient yield, however, to permit said gaff hook to swing into operative position in close proximity to the bait hook and to hold the fish on the latter. The gaff hook preferably is arranged with respect to said spring and to its pivot so that it will resist minor pulls and will only be swung into operative position under the influence of a pull of predetermined strength on the line connection. This, thus prevents said gaff hook from moving out of parallelism and crosswise of the stream except when a pull of sufficient intensity results to cause said gaff hook to be actuated to engage a fish.

The details of my invention are hereinafter described with reference to the accompanying drawing, in which:

Fig. 1 is an elevation of a fishing device embodying my invention in which the gaff hook is arranged in inoperative position;

Fig. 2 is a similar view in which said gaff hook has been pulled to operative position by a predetermined line pull;

Fig. 3 is a broken and foreshortened view showing structural details of the body of said device;

Fig. 4 is an elevation of a modification of my invention;

Figs. 5 and 6 are perspective views of the details of the body, Fig. 6 having a portion shown broken away to disclose further details;

Fig. 7 is an elevation of said latter modification of my invention in which the gaff hook is swung to operative position; and Fig. 8 is a perspective view of a still further modification of my invention in which the gaff hook is shown in full line in inoperative position and in dotted lines in operative position.

In the embodiment of the invention shown in Figs. 1 to 3, inclusive, said fishing device comprises a body $a$ comprising two laterally offset flange portion $a'$ and $a2$. At one end thereof, an upturned flange portion $a3$ serves as a guide for a reciprocally mounted line connection $b$. Said line connection is a rod having a loop $b'$ formed at one end to which the fish line can be secured. At the other end an eye $b2$ is formed to which one end of a gaff hook $c$ is pivotally secured. Said gaff hook $c$ is carried by a link $d$ pivotally secured on a pin $d'$ to a tab $a4$ formed integrally with the body $a$. Fixed to said line connection is a ferrule $e$ which is adapted to engage one end of a coil spring $f$ encircling said line connection. The other end of said spring engages the end of the guide flange $a3$ on said body, the spring being adapted to be compressed between said ferrule and said guide.

At the end of said body, away from the guide $a3$ a bait hook $g$ is secured. Said hook is mounted in a socket $g'$ carried by said body. Although said hook $g$ is referred to as a bait hook, it is to be considered the hook which actually engages a fish. A bait, lure, spinner or similar device may be arranged thereon or adjacent thereto to attract a fish. The function of said hook $g$ is to catch the fish and may or may not actually carry bait as the tempting element for attracting a fish's attention.

The spring $f$ is of sufficient strength to hold the gaff hook in inoperative position as is shown in Fig. 1. A pull of sufficient intensity on the bait hook will cause the spring to be compressed and the gaff hook to be swung into the position in Fig. 2. In said latter position, the two hooks are arranged so that the bait hook $g$ engages one side of the fish's mouth, and the gaff hook is adapted to strike said fish just behind the head. The more force exerted by the fish to disengage the bait hook $g$ from its mouth will cause the gaff hook to be driven further into its head. As is illustrated in Fig. 2, the link $d$ is adapted to pivot about the pin $d'$ to accommodate the movement of the gaff hook in swinging from inoperative to operative position. Said gaff hook is bent to accommodate movement from one position to the other.

In Figs. 4 to 7 a slightly different modification is shown, namely, that the body of the device itself is formed to constitute the line connections. Said body comprises two parts $h$ and $i$. The member $h$ comprises a flat section terminating in a T-shaped head $h'$ at one end and in a socket $h2$ at the other for holding a bait hook $j$ therein. Intermediate said ends a flattened section $h3$ is provided having an offset lateral flange $h4$ formed integral therewith. The member $i$ is bifurcated and terminates at one end in a similar T-shaped head $i'$ arranged at the end of one of said legs. At the end of the other leg, a pivotal connection $i2$ is formed for engagement with a gaff hook $k$. Said gaff hook is adapted to pass thru an elongated hole $h5$ formed in the offset flange $h4$, as is illustrated in Fig. 7, and the relative positions of the pivotal connection $i2$ and the hole $h5$ determines the position of the gaff hook. The members $h$ and $i$ are permitted longitudinal movement with relation to each other and a coiled spring $l$, engaging the heads $h'$ and $i'$ respectively, tends to hold said parts in the position shown in Fig. 4. A predetermined pull on the line $m$ passing thru the eyelet $m'$ causes said parts to move to the position shown in Fig. 7 to bring the gaff hook into operative position.

In the modification shown in Fig. 8, the body $n$ is shown formed into a lure of the spinner type. That is, the body is formed to resemble a small fish, and its forward end $n'$ is offset in one direction and its tail portion $n2$ in the opposite direction so that it will tend to dart or whirl thru the water. Arranged on one face of said body is a pivoted link $o$ similar to the link $d$ in the first modification. Said link is pivotally riveted or otherwise secured to said body by a member $o'$.

Arranged at the opposite end of said body, is a laterally turned flange $p$ which serves as a guiding member for a line connecting element $q$. Said element $q$ is pivotally secured to the end of a gaff hook $r$ by a pivoted connector element $q'$. A coiled spring $s$ is secured about said connecting element $q$ and a ferrule $t$ is fixed to said element $q$. The ends of the coiled spring, respectively, bear against the offset flange $p$ and the ferrule at opposite ends thereof, and the spring is compressed, as in the previous modifications, between said members. The gaff hook is normally arranged in the position shown in full lines in Fig. 8 by the action of the coiled spring $s$. A predetermined line pull will cause said gaff hook and its link $o$ to move into the position shown in dotted lines in said figure. A bait hook $u$ is secured to the tail $n2$ of said body by a ring $u'$ so that it will have some articulation therewith, and the gaff hook is adapted to swing into the same approximate position with respect to said bait hook as it does in the previously mentioned modifications.

I claim:

1. A fishing device comprising a body, a bait hook, and a gaff hook pivotally secured to said body, said gaff hook in inoperative position being arranged parallel with said body with the hooked portion thereof spaced widely from the bait hook, a line connection including a reciprocally mounted member carried by said body, said line connection being operatively secured to the gaff hook, and spring means resiliently tending to hold the gaff hook in inoperative position in the absence of predetermined pull upon the bait hook and having sufficient yield to permit said gaff hook to swing into operative position in proximity with the bait hook under the influence of such a pull.

2. A fishing device comprising a body, a bait hook, and a gaff hook pivotally secured to said body, said gaff hook in inoperative position being arranged parallel with said body with the hooked portion thereof spaced widely from the bait hook, a line connection including a reciprocally mounted member carried by said body, said line connection being operatively secured to the gaff hook, and a coiled spring surrounding the line connection resiliently tending to hold the gaff hook in inoperative position in the absence of predetermined pull upon the bait hook and having sufficient yield to permit said gaff hook to swing into operative position in proximity with the bait hook under the influence of such a pull.

3. A fishing device comprising a body, a bait hook, and a gaff hook pivotally secured to said body, said gaff hook in inoperative position being arranged parallel with said body with the hooked portion thereof spaced widely from the bait hook, and a line connection including a reciprocally mounted member carried by said body, said line connection being operatively secured to the gaff hook, said gaff hook being resiliently held to resist movement except under a predetermined pull on said line connection.

4. A fishing device comprising a body, a bait hook, and a gaff hook pivotally secured to said body, a line connection including a reciprocally mounted member carried by said body, said line connection being operatively secured to the gaff hook, a coiled spring surrounding the line connection adapted to hold the gaff hook in inoperative position and having sufficient yield to permit said gaff hook to swing into operative position in proximity with the bait hook, and a ferrule on the line connection engaging the spring.

5. A fishing device comprising a body, a bait hook, and a gaff hook pivotally secured to said body, a line connection including a reciprocally mounted member carried by said body, said line connection being operatively secured to the gaff hook, a coiled spring surrounding the line connection adapted to hold the gaff hook in inoperative position and having sufficient yield to permit said gaff hook to swing into operative position in proximity with the bait hook, and a shouldered abutment on the line connection engaging the spring.

6. A fishing device comprising a body, a bait hook, and a gaff hook pivotally secured to said body, a line connection including a reciprocally mounted member carried by said body, said line connection being operatively secured to the gaff hook, a coiled spring surrounding the line connection adapted to hold the gaff hook in inoperative position and having sufficient yield to permit said gaff hook to swing into operative position in proximity with the bait hook, and a shouldered abutment on the line connection engaging the spring, said gaff hook and said spring being positioned to resist movement except under a predetermined pull on said line connection.

AUSTIN O. MIDDLEMISS.